July 7, 1936.    C. W. A. KOELKBECK    2,047,148
RAILWAY VEHICLE
Filed April 24, 1934    2 Sheets-Sheet 1
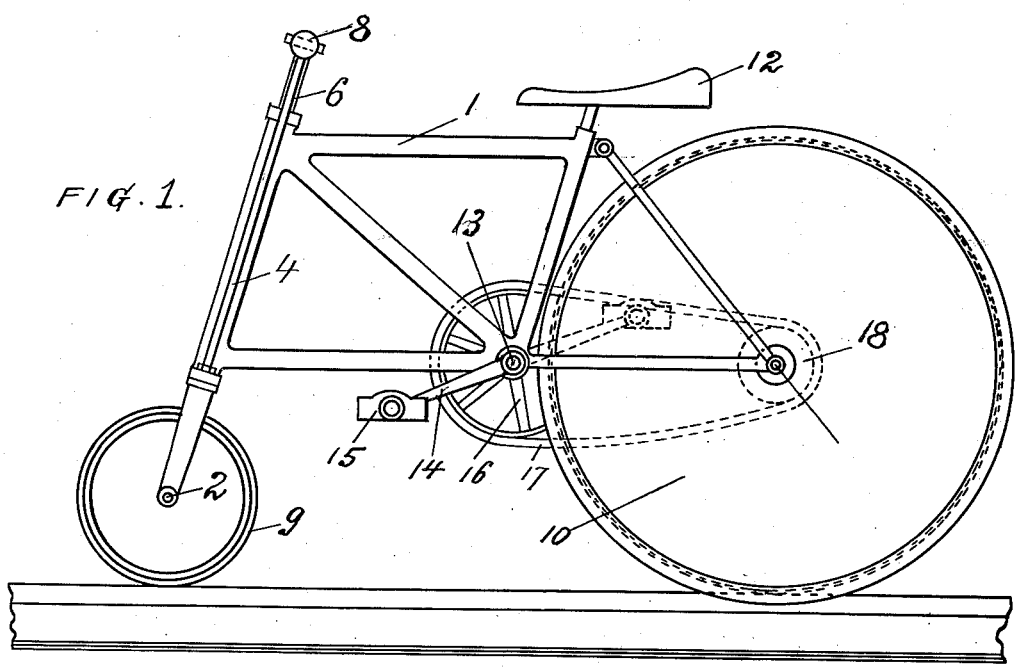
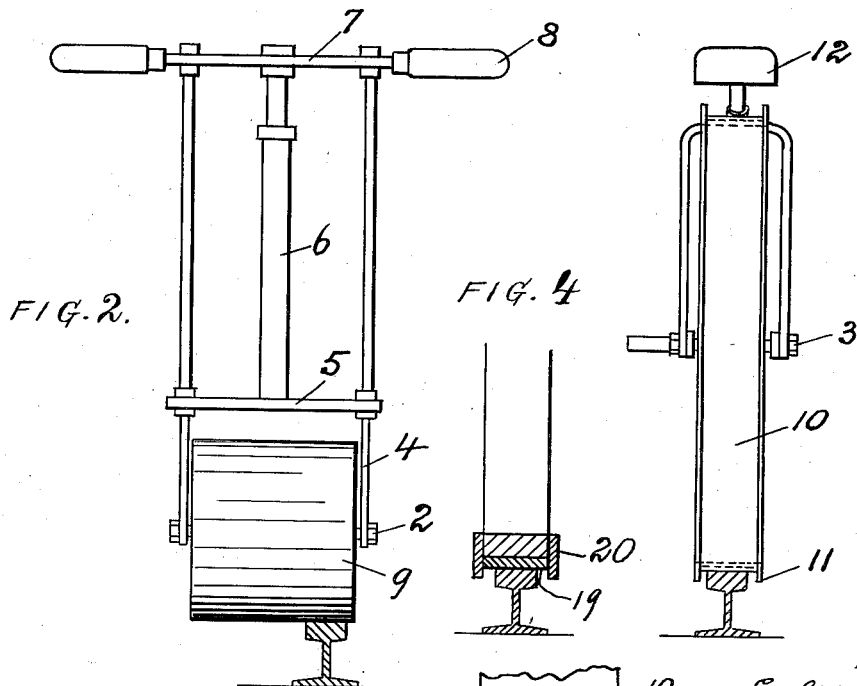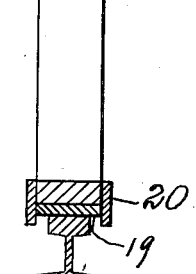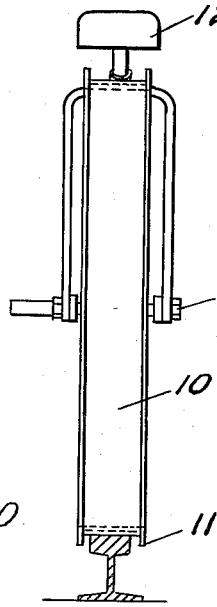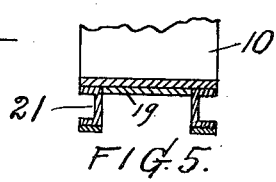
INVENTOR.
Carl W. a. Koelkbeck
BY William B. Jaspert
ATTORNEY.

July 7, 1936.                C. W. A. KOELKBECK                2,047,148
                                 RAILWAY VEHICLE
                             Filed April 24, 1934            2 Sheets-Sheet 2
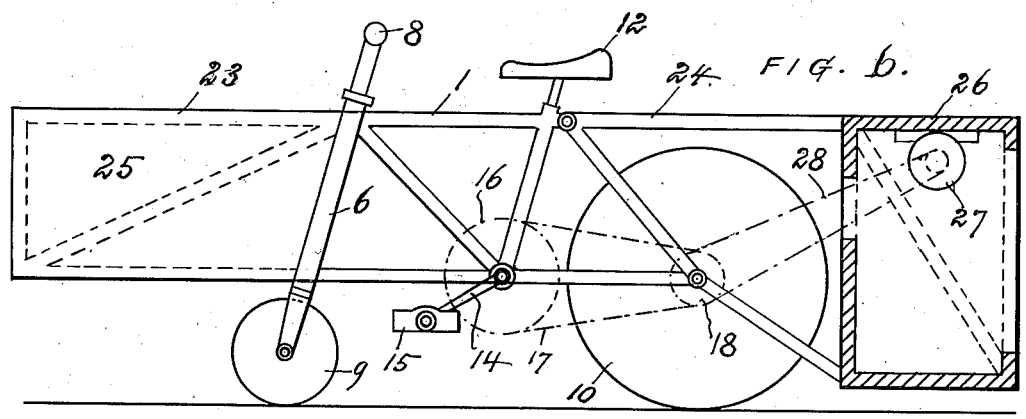
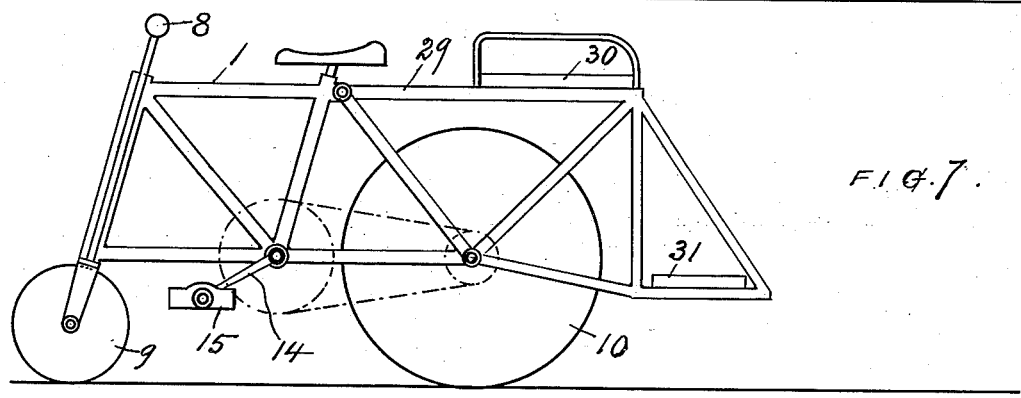
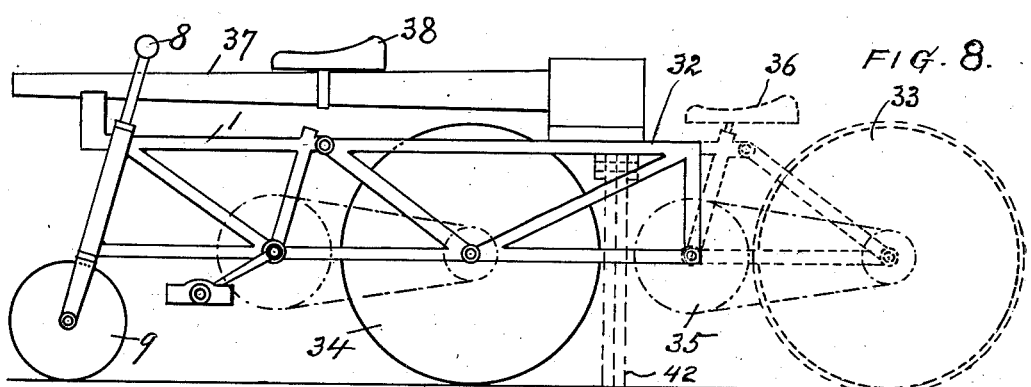
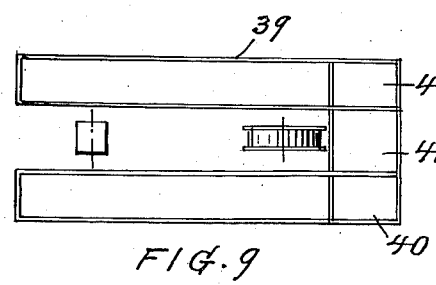
INVENTOR.
Carl W. A. Koelkbeck
BY William B. Jaspert
ATTORNEY.

Patented July 7, 1936

2,047,148

UNITED STATES PATENT OFFICE 2,047,148

RAILWAY VEHICLE

Carl W. A. Koelkebeck, Pittsburgh, Pa., assignor to Martha Johanna Koelkebeck, Pittsburgh, Pa.

Application April 24, 1934, Serial No. 722,051

1 Claim. (Cl. 105—95)

This invention relates to new and useful improvements in railway vehicles more particularly vehicles adapted to travel on mono-rails and it is among the objects thereof to provide a vehicle of the character of a bicycle which shall be provided with wheel structures that render it operable on mono-rails.

A further object of the invention is the provision of a vehicle having general utility for railroad work particularly in connection with track maintenance and emergency service.

These and other objects of the invention will become more apparent from a consideration of the accompanying drawings constituting a part hereof in which like reference characters designate like parts and in which:

Fig. 1 is a side elevational view of a vehicle embodying the principles of this invention;

Fig. 2 a front elevational view thereof;

Fig. 3 a rear elevation;

Fig. 4 a cross-sectional view of a portion of the vehicle wheel;

Fig. 5 a cross-sectional view of a portion of a modified form of vehicle wheel;

Fig. 6 a side elevational view illustrating a special form of the device;

Fig. 7 a side elevational view of still another modification of the vehicle shown in Fig. 1;

Fig. 8 a side elevational view illustrating a tandem arrangement of vehicle; and Fig. 9 a plan view diagrammatically illustrating a form of the device with service compartments supported thereon.

With reference to Figs. 1 to 5 inclusive of the drawings, the structure therein illustrated comprises a frame 1 of the general character of a bicycle frame adapted to distribute its load on wheel axles 2 and 3. The front axle 2 is mounted on a bifurcated frame having side portions 4, cross-member 5, and a central vertical column 6 to which is attached a handle bar 7 having handles 8.

A flangeless wheel 9 having a relatively wide tread is journalled on the axle 2, the wheel 9 being constructed of light metal such as aluminum alloy.

A rear wheel 10 is journalled on axle 3, the wheel 10 being provided with side flanges 11 which are adapted to cooperate with the rail on which it travels. A seat or saddle 12 is provided on the rear of frame 1 and a drive shaft 13 provided with cranks 14 and pedals 15 is journalled in the lower portion of the frame, the drive shaft 13 carrying a sprocket wheel 16 which, through a chain 17, transmits power to the sprocket wheel 18 on wheel 10.

The rear wheel 10 may have the form shown in Fig. 4 in which the tread 19 is provided with a non-metallic surface material to render it practically noiseless in its running contact with the rail. In this construction as in Fig. 3, flanges 20 are employed to guide the wheel on the rail.

In Fig. 5 is shown a rear wheel 10 with radial flanges 21 in the shape of channels, these flanges being provided on the tread of the wheel to give it traction when used on road surface instead of on a rail.

In the operation of the simple form of vehicle shown in Figs. 1 to 5 inclusive, the relative wide tread on the front wheel permits of transverse lateral displacement on the rail such as is ordinarily necessary to maneuver in the maintenance of proper balance, this offering no difficulty to the rider in as much as the rear wheel 10 with its flange 11 is self-centering on the track. By utilizing a wide tread on the front vehicle wheel, sufficient oscillatory motion is permissible to balance the vehicle on the track and such oscillations as will occur when the vehicle is set in motion will almost disappear as the vehicle picks up speed and are, therefore, negligible to a skilled operator.

A device of the simple form of Figs. 1 to 5 is especially useful for track inspection in railroad maintenance as it permits covering long stretches in a minimum of time with a minimum of effort and with perfect comfort to the user, and which is also available as quick transportation by railroad employees and others.

The vehicle can be equipped with auxiliary riding supports and carrying compartments to give it greater utility, such structures being shown in Figs. 6 to 9 inclusive of the drawings and consisting of the following.

In the structure shown in Fig. 6, the frame 1 is provided with a forward extension 23 having a rearwardly extending frame 24, the front frame having a compartment 25 built thereon for carrying tools or other emergency equipment, and the rear frame 24 is provided with a compartment 26 which may contain a motor 27 with a drive chain 28 connected to the sprocket wheel 18, and compartment 26 may further house storage batteries for the motor 27. Where a motor is employed, the foot operated cranks 14 may be retained or eliminated as desired.

In the construction shown in Fig. 7 the frame 1 is provided with an extension frame 29 having a seat 30 and a foot support 31 for carrying one or more extra passengers, this being a lightweight and durable construction similar to the structure shown in Fig. 1.

In Fig. 8 the frame 1 is provided with a long extending frame portion 32 to the rear of which may be provided a tandem arrangement, diagrammatically illustrated by the dotted lines, which provide an extra wheel 33 which is a flanged wheel as shown in Fig. 3 and with this arrangement the center wheel 34 may be flangeless and somewhat wider than the rail face.

In the tandem arrangement an extra drive of the foot pedal type generally designated by the numeral 35 may be employed and a seat 36 is provided for the operator at the rear of the vehicle.

The construction of Figure 8 may be employed for transporting bars or tools and the like, or a machine gun designated by the numeral 37 may be mounted on the frame with a seat 38 secured thereto.

In Fig. 9 is illustrated an arrangement for carrying relatively long compartments 39 with smaller rear compartments 40 and 41, the long side compartments 39 being adapted for supporting prostrated forms in wreck emergency service and the smaller rear compartments may be utilized for housing emergency needs, the vehicle being otherwise as shown in Fig. 1 for example.

Such vehicles as are provided with extension frames or compartments to accommodate heavy loads, may be provided with side braces 42, Fig. 8, for supporting the vehicle while loading, etc.

It is evident from the foregoing description of my invention that a mono-rail vehicle of the character therein disclosed may be usefully employed in railway service at a minimum cost of installation and with substantially no maintenance expense. The frame and wheels may be constructed of light and mechanically durable materials so that such vehicle can be readily managed by a single individual, thus adapting it for ready placement and removal from the track so as to make it available for immediate use without interfering with normal traffic conditions on a railway.

Although various embodiments of the invention have been herein illustrated and described, it will be obvious to those skilled in the art that various modifications may be made in the details of construction without departing from the principles herein set forth.

I claim:

A railway vehicle comprising a light frame structure, having a single front and rear wheel, the rear wheel being mounted in fixed alinement with the frame and the front wheel being mounted on a pivotal frame, said front wheel having a flangeless tread several times the width of the rail face and being of relatively small diameter, and the rear wheel having a relatively narrow flanged tread and being of substantially greater diameter than said front wheel.

CARL W. A. KOELKEBECK.